UNITED STATES PATENT OFFICE.

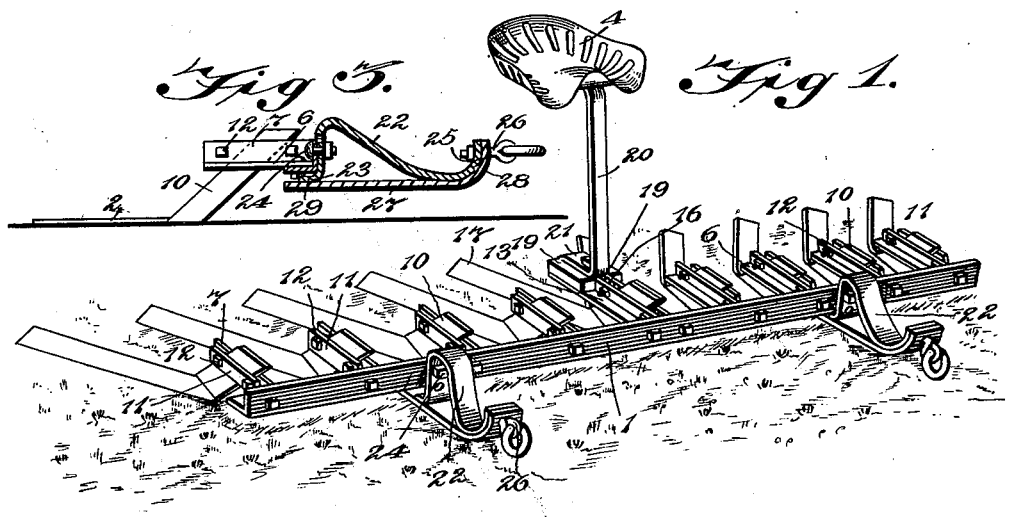

CHARLES F. GRIMM AND RUFUS FULLERTON, OF OAKESDALE, WASHINGTON.

CULTIVATOR.

SPECIFICATION forming part of Letters Patent No. 652,842, dated July 3, 1900.

Application filed April 9, 1900. Serial No. 12,201. (No model.)

*To all whom it may concern:*

Be it known that we, CHARLES F. GRIMM and RUFUS FULLERTON, citizens of the United States, residing at Oakesdale, in the county of Whitman and State of Washington, have invented a new and useful Cultivator, of which the following is a specification.

This invention relates to cultivators, and has for its object to provide an improved device of this character which is especially designed to scrape the surface of the ground for the purpose of destroying the spontaneous growth which springs up after summer fallowing. It is furthermore designed to provide an improved connection between the scraper-blades and the frame of the device, and also to provide an improved draft connection, so that the height of the draft may be conveniently adjusted to vary the inclination of the action of the scraper-blades.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a perspective view of a cultivator constructed and arranged in accordance with the present invention. Fig. 2 is a top plan view thereof. Fig. 3 is a transverse sectional view taken on the line 3 3 of Fig. 2.

Corresponding parts in the several figures of the drawings are designated by like characters of reference.

Referring to the accompanying drawings, 1 designates a straight angle-beam which forms the frame of the cultivator and to which are connected the scraper-blades 2, the opposite draft connections 3, and the driver's seat 4. This angle-beam is arranged with one side 5 in a substantially-horizontal position and projecting rearwardly from the under edge of the opposite upstanding side thereof, and bolted or otherwise secured to the upper face of the rearwardly-extending side of the frame-beam is a plurality of angle-plates 6, which have the inner ends of the upstanding sides 7 bent outwardly and opposite to the side 6, so as to form the ears 8, which are secured to the rear face of the upstanding side of the frame-beam by means of suitable fastenings 9. Thus these angle-plates are secured to both sides or sections of the angle-frame beam and also project a suitable distance in rear thereof.

Each angle-plate is provided with a scraper-blade 2, which is formed from a single plate that is bent intermediate of its ends, so as to form a shank 10, which inclines upwardly and forwardly in a vertical plane, while the blade proper is in a substantially-horizontal plane to scrape the surface of the ground. Each shank is fitted flat against the outer face of the upstanding side of the respective angle-plate and is secured thereto by means of a clamp-strap 11, that embraces the outer side of the shank and is secured at its opposite ends to the angle-plate by means of removable fastenings 12, which are located beyond the opposite front and rear edges of the shank. By this arrangement the shanks are not weakened by perforations for the reception of fastenings, and the draft upon the blades will draw the front and rear edges of the shanks against the respective fastenings 12, and thereby prevent loss of the blades. Also the blades may be readily and conveniently replaced when worn or broken.

As best illustrated in Fig. 2, it will be seen that the blades are arranged in two groups, one at each side of the cultivator, the blades of each group being inclined rearwardly and outwardly toward its respective side, and the adjacent blades overlap, so as to effectually scrape the ground and destroy the vegetation. The groups of blades are separated by a central intermediate space in which are located a pair of angle-plates 13 and 14, which are longer than the similar plates 6 and have their upstanding sides or flanges located upon the inner sides of the plates, and thereby adjacent to each other, so as to form clamps for the shanks or stems 16 of the pair of central blades 17, each of which belongs to one of the groups of blades. These plates 13 and 14 are secured to the frame-beam in the manner described for the other similar plates, but are somewhat longer and have their adjacent sides connected by removable fastenings 18 to clamp upon the shanks of the central blades. In rear of the shanks 16 and secured rigidly to the respective angle-plates 13 and 14 are suitable blocks 19 to form a broad bearing or base for the attachment of the seat-standard 20, which has its lower end bent rearwardly, so as to form a foot 21, which is secured to the blocks and the angle-plates in any suitable manner, whereby the weight of the driver is located substantially midway between the front and rear edges of the cultivator and at the forward ends of the blades.

The draft connections for the cultivator comprise the opposite bars 22, which have pendent flanges 23 at their rear ends, said flanges being fitted against the outer side of the angle-beam 1 and provided with a plurality of vertically-disposed perforations for the reception of a bolt 24, whereby the draft-bars may be adjusted vertically upon the cultivator-frame, so as to vary the inclination of the action of the scraper-blades, as will be understood. The forward end of each draft-bar inclines downwardly, so as to form an angular bar, and is provided at its outer end with an upstanding transverse flange or shoulder 25, to which is connected an eyebolt 26 for connection with the draft-animals. Each draft-bar is braced and strengthened by means of a flat bar 27, which has its outer end provided with an upstanding flange 28, fitting snugly against the similar flange of the draft-bar and receiving the eyebolt. The rear portion of this brace-bar extends in rear of the draft-bar, and the latter is provided with a terminal flange 29, that is secured to the upper face of the brace-bar.

What is claimed is—

1. In a cultivator, a frame comprising a transverse angle-beam, having one side extending rearwardly in substantially a horizontal plane from the opposite side thereof, angle-plates having their horizontal sides connected to the horizontal side of the frame-beam, and their opposite upstanding sides provided with inner lateral flanges that are secured to the rear face of the upstanding side of the frame-beam, and pendent scraper-blades secured to the respective angle-plates.

2. In a cultivator, a frame comprising a transverse angle-beam, rearwardly-extending angle-plates, having their respective sides connected to the horizontal side of the frame-beam, and their opposite upstanding sides provided with inner lateral flanges secured to the upstanding side of the frame-beam, scraper-blades having upwardly and forwardly inclined shanks fitted flat against the outer sides of the upstanding parts of the respective angle-plates, clamp-straps extending transversely across the respective shanks, and fastenings connecting the opposite ends of the straps to the angle-plates and clamping said straps upon the shanks.

3. In a cultivator, a frame, comprising a transverse angle-beam, a pair of angle-plates, having their horizontal sides connected to the horizontal side of the frame-beam, the upstanding sides of the plates being arranged adjacent to each other, and provided with inner and oppositely-extending flanges secured to the upstanding side of the frame-beam, one or more scraper-blades, each blade having its shank located between the adjacent sides of the angle-plates, opposite fastenings connecting the adjacent sides of the plates and clamping the latter upon the shank, and a seat supported upon the rear ends of the plates.

4. The combination with a cultivator, of a draft device, comprising a draft-bar, having a rear pendent flange to fit against the frame of the cultivator, and provided with a plurality of vertically-disposed openings, a fastening for engagement with any of the openings and to vertically adjustably secure the bar to the frame, the main portion of the bar being inclined downwardly and forwardly, and provided with a terminal upstanding flange, a brace-bar fitted to the under side of the draft-bar, connected to the lower end of the rear flange, and having a front upstanding flange snugly fitting the similar flange of the draft-bar, and an eyebolt extending through the combined flanges, and for connection with a draft-animal.

In testimony that we claim the foregoing as our own we have hereto affixed our signatures in the presence of two witnesses.

CHARLES F. GRIMM.
RUFUS FULLERTON.

Witnesses:
R. H. HUTCHINSON,
T. S. HUTCHINSON.